United States Patent [19]
Habermann et al.

[11] 3,994,973
[45] *Nov. 30, 1976

[54] CATALYSTS FOR THE HYDRATION OF NITRILES TO AMIDES

[75] Inventors: Clarence E. Habermann; Ben A. Tefertiller, both of Midland, Mich.

[73] Assignee: The Dow Chemical Company, Midland, Mich.

[ * ] Notice: The portion of the term of this patent subsequent to Dec. 28, 1988, has been disclaimed.

[22] Filed: June 28, 1971

[21] Appl. No.: 157,647

Related U.S. Application Data

[63] Continuation-in-part of Ser. No. 835,765, June 23, 1969, Pat. No. 3,631,104.

[52] U.S. Cl............................ 260/561 N; 260/465.6
[51] Int. Cl.$^2$........................................ C07C 103/56
[58] Field of Search............. 260/561 R, 561 N, 404

[56] References Cited
UNITED STATES PATENTS
3,631,104   12/1971   Habermann et al............ 260/561 N FOREIGN PATENTS OR APPLICATIONS
2,036,126   2/1971   Germany........................ 260/561 N Primary Examiner—Ethel G. Love
Attorney, Agent, or Firm—C. E. Rehberg; D. H. Fifield

[57] ABSTRACT

Cupreous catalysts containing (a) copper prepared by reducing copper oxide, (b) reduced copper oxide, or (c) copper oxide have been found to be excellent heterogeneous catalysts for the conversion of nitriles in the presence of water to the corresponding amides. High conversions and yields are obtained with little or no deleterious by-products.

19 Claims, No Drawings

CATALYSTS FOR THE HYDRATION OF NITRILES TO AMIDES

CROSS-REFERENCE TO RELATED APPLICATIONS

This is a continuation-in-part of our application Ser. No. 835,765 filed June 23, 1969, now U.S. Pat. No. 3,631,104.

BACKGROUND OF THE INVENTION

Watanabe, in Bull. Chem. Soc. Japan, 37, 1325 (1964), teaches the conversion of benzonitrile to benzamide with precipitated copper and Urushibara copper (U-Cu). The precipitated copper was prepared from a cupric chloride solution and zinc dust and was reacted with benzonitrile in water for 8 hours to give a 7% yield of benzamide. U-Cu-A was prepared by mixing zinc dust with a solution of cupric chloride and then leaching the resultant product with 13% acetic acid. The reaction of benzonitrile in water with U-Cu-A for 8 hours gave a 24% yield of benzamide with no recovery of benzonitrile.

Watanabe in the same reference shows the use of a mixture of NiO+CuO in unspecified proportions to convert benzonitrile to benzamide in the presence of ethanol under reflux conditions. In 10 hours he received a 5% yield of benzamide. Also, Watanabe states in column 1 on page 1325 that in the reaction of aliphatic nitriles, the yield of amides is lower and side reactions are more pronounced when compared to the reaction using aromatic nitriles. For such reactions, he apparently used only nickel catalysts, but the same drawbacks would be expected for copper catalysts.

Watanabe et al., in Bull. Chem. Soc. Japan, 39, 8 (1966) also show the use of a "copper chromium oxide" catalyst, "Cu-CrO$_2$," to convert benzonitrile to benzamide. Although the preparation is not-disclosed, Watanabe's catalyst apparently was not prepared according to the present invention since benzonitrile in water reacted in the presence of the catalyst for 8 hours gave only a 20% yield of benzamide.

Copper-chromium oxides may be generally referred to as Adkins catalysts, so named after a pioneer in the field, Homer Adkins. The oxides may be prepared by a number of different procedures — for example, by the decomposition of copper ammonium chromate, by the decomposition of copper ammonium chromium carbonates, by the decomposition of copper-chromium nitrates or by grinding or heating together copper oxide and chromium oxides. Although the products of these reactions are generally regarded to be composed of copper oxide and chromium oxide of the general formula CuCr$_2$O$_4$, Stroupe, in J.A.C.S. 71, 569 (1949) indicates that the exact nature of such copper-chromium oxides is not known. Any preparation that produces copper oxide in combination with chromium oxide apparently is acceptable to prepare such Adkins catalysts, with the product formed by the decomposition of the copper ammonium chromate being one of the best since the product is very finely divided.

The copper ammonium chromate salts may be prepared by mixing aqueous solutions containing molar equivalent amounts of copper nitrate and ammonium chromate. The precipitate thus formed is recovered and when slightly heated decomposes spontaneously with the evolution of heat to form copper-chromium oxide. A barium, calcium or magnesium compound may also be added before precipitation as a stabilizer.

The preparation of various copper-chromium oxides is taught by Connor et al. in J.A.C.S 54, 1138, (1932), Young et al. in U.S. Pat. No. 2,575,403, Kirsch et al. in U.S. Pat. No. 2,964,579, Adkins et al. in J.A.C.S. 72, 2626 (1950) and Groger, Z. Anorg. Chem., 58, 412 (1908); 76, 30 (1912).

At the present time, the principal method of producing acrylamide on an industrial scale is the acid-catalyzed hydration of acrylonitrile. The great disadvantages of this acid process have been the accompanying sulfate pollution and large amount of sulfuric acid wasted. Some acrylamide plants recover the waste sulfuric acid in the form of ammonium sulfate, but others neutralize and dispose of the waste acid. The problem of disposal, the problem of pollution and the expense of the wasted sulfuric acid have created a search for a better method of preparing acrylamide which does not have the disadvantages of the acid process.

SUMMARY OF THE INVENTION

It has now been found that aliphatic nitriles may be reacted to form the corresponding amides by contacting the nitrile in the presence of water with a cupreous catalyst containing a catalytic amount of (a) copper prepared by reducing copper oxide, (b) reduced copper oxide, or (c) catalysts containing copper oxide, such as copper oxide, copper-chromium oxide, and copper-molybdenum oxide, and it has also been found that the effectiveness of the copper oxide for the hydration of either aliphatic or aromatic nitriles is greatly increased by at least partially reducing the copper oxide of such catalyst before or during its use to obtain a catalyst of reduced copper oxide or copper prepared by reducing copper oxide.

After contact with the catalyst, the amide is recovered from any unconverted reactants and by-products by any conventional method, such as distillation, or alternatively, because both the conversion and yield approach 100% under optimum conditions, the product stream is used without separation or purification.

The cupreous catalysts of the present invention contain: (a) copper prepared by reducing copper oxide; (b) reduced copper oxide; or (c) copper oxide. These catalysts may suitably be used alone or in combination with any other catalytic or noncatalytic material. For example, the catalysts may be stabilized with compounds containing barium, calcium, magnesium, or other stabilizing material. Also, any of the catalysts may also be supported on alumina, silica, Kieselguhr, pumice, diatomaceous earth or any other support. In addition, the catalysts may be combined with other materials such as metal oxides. Such combinations are shown more fully below for the copper catalysts containing chromium oxide and molybdenum oxide. The copending application of Habermann and Thomas, Ser. No. 47,166, filed June 17, 1970, describes the use of other metal oxides in this process. Moreover, the catalysts of the invention may contain essentially any organic or inorganic compound that does not significantly impair the catalytic activity in the process of the invention.

The copper catalyst of the invention is prepared by completely reducing copper oxide. The copper oxide reduced can be obtained directly as the oxide or it may be prepared by decomposition and/or reduction of other compounds, such as copper hydroxide, copper carbonate, copper acetate, copper oxalate, copper nitrate, and the like. The desirable copper catalyst is prepared by contacting with a reducing agent that will give a catalytic copper. Preferred procedures for preparing such catalysts are described below.

The reduced copper oxide catalyst of the invention is prepared by partially but not completely reducing copper oxide. These catalysts are prepared by contacting copper oxide with any reducing agent which gives a catalytically active cupreous material for use in the process of the invention. The reduced copper oxide catalysts are conveniently prepared by the preferred methods described below.

The unreduced copper oxide catalysts are not only important because they are active catalysts in themselves, but also because they are the starting materials reduced to obtain the very active catalysts of special interest, i.e., reduced copper oxide or copper prepared by reducing copper oxide.

Of course, the most readily available copper oxide catalyst of the invention is copper oxide itself. The copper oxide catalyst may be either cupric oxide, cuprous oxide or a mixture of the two. Both of the oxides are well known and may be obtained commercially or prepared by the decomposition of copper hydroxide, copper carbonate, copper oxalate, copper acetate or another decomposable copper salt.

Another copper oxide catalyst of the invention is copper-chromium oxide. The copper-chromium oxide catalysts may be purchased commercially or prepared by a number of known methods, for example, by the decomposition of copper ammonium chromate, by the decomposition of copper ammonium chromium carbonates, by the decomposition of copper-chromium nitrates, or by grinding and heating copper oxides and chromium oxides together. For purpose of definition, the copper content of such catalysts is present in the plus one or plus two oxidation state. These catalysts, generally considered to be mixtures of copper oxide and chromium oxide, may be used as such, or they may be reduced as described below.

Still another copper oxide catalyst of the invention is copper-molybdenum oxide. The copper-molybdenum oxide catalysts may be prepared in a manner similar to the copper-chromium oxides, for example, a copper-molybdenum oxide catalyst can be prepared by decomposing the precipitate formed upon mixing an aqueous solution of copper nitrate with an aqueous solution of ammonium molybdate. Other methods for preparing copper-molybdenum oxides, such as precipitation of soluble copper and molybdenum salts by a carbonate, can also be used. These catalysts, generally considered to be mixtures of copper oxide and molybdenum oxide, may be used as such, or they may be reduced as described below.

Preferred copper oxide catalysts of the invention are combinations consisting essentially of about 10 to about 90% by weight of copper oxide and about 10 to about 90% by weight of chromium oxide or molybdenum oxide. Also preferred are copper-chromium oxide catalysts and copper-molybdenum catalysts containing at least about 50% by weight of copper oxide.

As noted, reduced copper oxide and copper prepared by reducing copper oxide are not only effective for hydrating aliphatic nitriles, but they are also effective for converting aromatic nitriles to the corresponding amide. Of these catalysts, reduced copper-chromium oxide or reduced copper-molybdenum oxide is preferred, with catalysts which contained about 10 to about 90% by weight copper oxide and about 10 to about 90% by weight chromium oxide or molybdenum oxide before reduction being especially preferred. Copper-chromium oxide and copper-molybdenum oxide catalysts containing at least about 50% copper oxide before reduction are of special interest. Of all of the catalysts of the invention, reduced copper-chromium oxide is of greatest interest.

The partial or complete reduction of the copper oxides to produce the corresponding catalysts is generally accomplished by an ordinary hydrogen reduction although other methods of reduction may be used. In such hydrogen reduction, the catalyst containing copper oxide, such as copper oxide, copper-chromium oxide or copper-molybdenum oxide, is contacted with elemental hydrogen at the appropriate temperature to give the desired reduction.

For example, in the reduction of copper-chromium oxide, the reaction conditions are generally adjusted to reduce only copper oxide, chromate, $Cr_2O_4^=$, dichromate, $Cr_2O_7^=$ and chromium trioxide, $CrO_3$. Cupric oxide is reduced to either cuprous oxide or elemental copper and cuprous oxide may be at least partially reduced to elemental copper. The small amounts of chromate, dichromate and chromium trioxide present are reduced to chromic oxide, $Cr_2O_3$.

In a hydrogen reduction, the interrelationship of temperature, reaction time and quantity of hydrogen used control the amount of reduction and the oxidation state to which the oxide is reduced. To reduce copper oxide, chromate, dichromate and chromium trioxide to cuprous oxide, copper and chromic oxide, temperatures of about 50° to about 500° C. or more may suitably be used with temperatures of about 100° to about 300° C. being preferred and temperatures of about 120° to about 250° C. being of greatest interest. The reaction time and amount of hydrogen used may vary widely. As more reduction is desired, longer reaction times and more hydrogen are employed. After reduction, the catalysts are preferably protected from contact with oxygen to maintain their high activity.

The reduction of the oxide to the desired catalyst may be monitored and controlled by measuring either the quantity of hydrogen absorbed, the amount of water formed or the weight loss. The progress of the reduction may also be determined by X-ray diffraction, X-ray fluorescence or oxygen analysis.

Although reduction of the catalysts containing copper oxide, such as copper oxide, copper-chromium oxide and copper-molybdenum oxide with hydrogen is preferred, other methods of reduction may also be employed to prepare the reduced catalyst. For example, the catalyst may be prepared by contacting the oxide at under the appropriate conditions with $NaBH_4$, $NH_2OH$, hydrazine, carbon, carbon monoxide, a lower alkane or a lower alkanol or other reducing agent. Any reducing agent and conditions can be employed that will give an active catalyst. Of these other reducing agents, the use of $NaBH_4$ or hydrazine in the liquid phase is preferred.

Preferred reduced catalysts of the present invention contain both oxide and copper prepared by reducing copper oxide.

With proper reduction, catalysts containing reduced copper oxide or copper prepared by reducing copper oxide are substantially superior catalysts for making amides from nitriles. In addition to the high conversions and yields produced, the catalysts have long effective lives, and little or no deleterious by-products or waste products requiring separation are normally formed.

Any nitrile may suitably be used in the present invention, with aliphatic and aromatic hydrocarbon nitriles containing up to about 20 or more carbon atoms being preferred. For purpose of the invention, aromatic nitriles are defined as those nitriles having cyano groups attached to the aromatic nucleus. Representative examples of suitable nitriles include: saturated aliphatic hydrocarbon nitriles such as acetonitrile, propionitrile, pentanonitrile, dodecanonitrile, succinonitrile, adiponitrile and the like; unsaturated aliphatic hydrocarbon nitriles such as acrylonitrile, methacrylonitrile, crotonic nitrile, $\beta$-phenylacrylonitrile, 2-cyano-2-butene, 1-cyano-1-octene, 10-undecenonitrile, maleonitrile, fumaronitrile, and the like; and aromatic nitriles such as benzonitrile, p-toluonitrile, $\alpha$-naphthonitrile, phthalonitrile and the like. Of the nitriles suitable for use in the invention, the olefinic nitriles of 3 to 6 carbon atoms are especially preferred, with the conversion of acrylonitrile to acrylamide being of special interest.

The proportions of nitrile to water in the reactant mixture may vary widely because any amount of water that gives the hydration is acceptable. More important than the specific nitrile to water ratio is the extent of the interaction between the nitrile and water. A high degree of contact is desirable to assure the greatest efficiency in the reaction. For gaseous reactants, the nitrile and water are miscible in all proportions, but for liquid reactants, certain precautions may be necessary to insure that sufficient contact of the nitrile and water is maintained. The necessary contact may be realized by dissolving the nitrile in the water or by dissolving the water in the nitrile. Outside of the limits of the solubility of one of the reactants in the other, however, the reactant mixture may be agitated, a suitable solvent may be added or another means of increasing the contact of the reactants may be employed. Excess water is the preferred solvent although other inert solvents, such as alkanols, dioxane, dimethyl sulfoxide, acetone, dimethyl ether of ethylene glycol or tetrahydrofuran, may also be used.

The catalyst of the invention is convenient to use in both a batch process and a continuous flow process. Using either method, the nitrile and water are contacted with the catalyst under the appropriate reaction conditions, and the amide product is then recovered. Since the catalysts of the present invention are normally employed as essentially insoluble heterogeneous catalysts, a continuous flow reaction is preferred.

In a continuous flow reaction, the solid catalyst of the invention is packed into a reaction chamber having an inlet for reactants and an outlet for products. The reaction chamber is maintained at the desired reaction temperature and the rate of flow of reactants over the catalyst is controlled to give the desired contact of the reactants with the catalyst. The reactants may be fed over the solid catalyst as a gas or preferably as a liquid. The reaction product from the reactor may be used as such or purified by any known technique.

The temperature of the reaction may vary widely as different nitriles are used in the invention. Generally, the reaction is conducted within a temperature range of about 0° to about 400° C. At temperatures below this level, the reaction is impractically slow. Above this range, the reaction forms an increasing amount of undesirable byproducts. Within the broad temperature range, temperatures of about 25° to about 200° C. are preferred. For unsaturated nitriles which tend to polymerize, a reaction temperature of less than about 200° C., a polymerization inhibitor or dilute reaction solutions are desirable to avoid polymerization of the nitrile and possible poisoning of the catalyst.

The other reaction conditions are known in the art of using heterogeneous catalysts and are not critical in the invention. The important aspect of the invention is the use of the cupreous catalyst containing (a) copper prepared by reducing copper oxide, (b) reduced copper oxide, or (c) copper oxide to convert nitriles to the corresponding amides. By applying these catalysts to the reaction, excellent yields of amide and long catalyst life are realized.

SPECIFIC EMBODIMENTS

EXAMPLE 1

Preparation, Reduction and Use of a Copper-Chromium Oxide Containing 44% CuO and 56% $Cr_2O_3$.

A copper oxide-chromium oxide catalyst for use in the preparation of amides from nitriles was prepared by reacting ammonium chromate with copper chloride. To 25 grams of ammonium dichromate dissolved in 100 ml. of water, 30 ml. of ammonium hydroxide was added to obtain ammonium chromate. To the ammonium chromate solution, a solution of 20.2 grams of cupric chloride dissolved in 150 ml. of water was added slowly with continuous agitation. The resulting precipitate was separated and washed several times with approximately one liter of water each time. The separated precipitate was dried at 100° C. for 8 hours and then heated at 275° C. in air for 3 hours. The precipitate was reduced by a gaseous stream containing 130 cc./min. of hydrogen and 510 cc./min. nitrogen at a temperature of 250° C. for 4 hours to produce the reduced copper oxide-chromium oxide catalyst.

One gram of the catalyst prepared was reacted with 5 grams of a 7% solution of acrylonitrile in water at 135° C. for 1 hour to give a 72.5% conversion of acrylonitrile with an 87.9% yield of acrylamide based on the amount of acrylonitrile consumed.

EXAMPLE 2

Reduction and Use of a Copper-Chromium Oxide Containing 80% CuO and 17% $Cr_2O_3$.

About 22 grams of a commercially prepared catalyst containing 80% CuO and 17% $Cr_2O_3$ sold under the trade name Harshaw Cu0203 was ground and screened to obtain particles of 20–50 mesh size. The ground catalyst was then placed in a nickel boat inside a Pyrex tube, which was heated in a tube furnace. A stream of dry hydrogen was passed through the tube at a rate of 200 cc./min. while the temperature was regulated at 100° C. for 1 hour, 150° C. for the second hour and 175° C. for two additional hours. The catalyst was cooled after the activation, and then an air-argon mixture was passed over the catalyst to prevent rapid oxidation.

A continuous flow reactor was fabricated of stainless steel having a reaction chamber with a volume of 15 cc., a feed reservoir connected to the bottom of the reactor and a product container connected to the top of the reaction chamber. The reaction chamber was packed with 21 g. of the activated catalyst prepared above and the reactor was maintained at a temperature of 85° C. A 7% solution of acrylonitrile in water was passed over the catalyst bed at a rate of 14± 0.5 cc./hr. and under sufficient pressure to maintain the liquid phase.

The product solution was collected and cooled to room temperature. Samples were withdrawn from the product every 12 hours in bottles closed with rubber serum caps to prevent evaporation of the acrylonitrile and the sample was analyzed by gas-liquid chromatography using a weighed amount of dioxane as the internal standard.

The reaction was continuously run for over four weeks. During the entire period, yields of acrylamide greater than 96% and yields of β-hydroxypropionitrile less than 1% were obtained. The conversion remained essentially constant at about 100% during the first 100 hours of operation and then decreased linearly to 66% at 700 hours of operation with the same catalyst.

EXAMPLE 3

Reduction and Use of a Copper-Chromium Oxide Containing 42% CuO and 38% $Cr_2O_3$.

About 25 grams of a commercially prepared catalyst containing 42% CuO and 38% $Cr_2O_3$ sold under the trade name Harshaw Cu1808 was activated with hydrogen and tested as described in Example 2. The reaction chamber was packed with 23.5 g. of the activated catalyst, and the reactor was maintained at a temperature of 80° C.

Initially, the yield and conversion were only about 50%, and about 30% of the nitrile converted appeared as β-hydroxypropionitrile. However, after about 2 weeks, the conversion of acrylonitrile and the yield of acrylamide were 90% or better with the formation of less than 1% β-hydroxypropionitrile. Thereafter these values remained essentially constant until the experiment was terminated after more than 6 weeks of operation.

EXAMPLE 4

Reduction and Use of a Copper-Chromium Oxide Containing 40% Cu and 25.5% Cr.

In the same manner as described in Example 2, 16 grams of a copper-chromium oxide catalyst containing 40% Cu and 25.5% Cr sold under the trade name Girdler G-13, was activated with hydrogen and tested. The reaction chamber was charged with 14.7 g. of the activated catalyst and the reactor was maintained at 85° C.

Initially, the conversion of acrylonitrile was 47%, the yield of acrylamide was 59% and the yield of β-hydroxypropionitrile was 18%. During the 4 weeks of operation, the conversion increased to 58% and then decreased to 46%, the yield of acrylamide increased to 96% and the yield of β-hydroxypropionitrile decreased to 3%.

EXAMPLE 5

Reduction and Use of a Copper-Chromium Oxide Containing 32% Cu, 25% Cr and 11% Ba.

In the same manner as described in Example 2, about 23 grams of an oxide catalyst containing 32% Cu and 25% Cr and 11% Ba sold under the trade name Girdler G-22 was activated with hydrogen and tested. The reactor was packed with 21.5 g. of the activated catalyst and was maintained at 80° C.

Initially, the conversion of acrylonitrile was 73%, the yield of acrylamide was 59% and the yield of β-hydroxypropionitrile was 23%. The conversion decreased to 43% and then rose to 56%, the yield of acrylamide rose to 84% and the yield of β-hydroxypropionitrile decreased to 6% during the 120 hours of operation.

EXAMPLE 6

Reduction and Use of a Copper Oxide Catalyst Containing 99% CuO.

In the same manner as described in Example 2, 20 grams of a catalyst containing 99% CuO sold under the trade name Harshaw Cu0307 was activated with hydrogen and tested. The reactor was packed with 19 g. of the activated catalyst and the reactor was held at 80° C. The reactor was run continuously for over 2 weeks during which period the conversion decreased from 75 to 33%, the yield of acrylamide was essentially constant at 91% and the yield of β-hydroxypropionitrile decreased from 3 to 1%.

EXAMPLE 7

Use of a Copper-Chromium Oxide Catalyst Sold under the Trade Name Calsicat 66-12-49-1B.

To a glass tube sealed at one end was added 5 grams of 7% by weight solution of acrylonitrile in water and one gram of finely divided copper chromium oxide catalyst sold under the trade name Calsicat 66-12-49-1B. The tube was sealed and heated for 20 minutes at 155° C. with agitation. The tube was cooled rapidly in an ice bath and an aliquot was analyzed by vapor phase chromatography. The conversion of the acrylonitrile was found to be 45% with a 100% yield of acrylamide.

EXAMPLE 8

Reduction and Use of a Catalyst Containing 80% CuO and 17% $Cr_2O_3$.

40.32 Grams of the unreduced copper-chromium oxide catalyst of Example 2 was reduced with a 2000 cc./min. gas flow containing 5% $H_2$ and 95% $N_2$ by volume for 6 hours at a temperature of 175° C. for the entire period. Rather than exposing the catalyst to air-argon after reduction, the catalyst was maintained under nitrogen and not exposed to air at any time. Oxygen was also excluded from the nitrogen used to pressurize the feed solutions and from the water entering the feed.

The reactor of Example 2 was packed with 25.80 g. of the reduced catalyst and run as shown in that example. For the first 75 hours of operation, the temperature of the reaction was maintained at 75° C., from 75 hours of operation until 412 hours the temperature was 80° C. and from 412 hours to almost 900 hours the temperature was 85° C. Initially, the conversion of acrylonitrile was 96% with a 97% yield of acrylamide while no β-hydroxypropionitrile or other by-products were formed. During the entire 5 weeks of continuous operation, both the conversion of acrylonitrile and yield of acrylamide were above 90% while no β-hydroxypropionitrile or other by-products were formed.

EXAMPLE 9

Use of Copper Oxide

In a continuous run, a solution of 3% water in acrylonitrile was fed over 35.64 g. of a copper oxide catalyst containing 99% CuO and sold under the trade name Harshaw Cu0307. The feed rate was 6 cc./hr. at 70° C. Over 26 hours the average conversion to acrylamide was 4.2% of the theoretical, and no by-products were found.

EXAMPLE 10

Use of Reduced Copper Oxide on a Copper Support

A catalyst was prepared by heating 8.2 g. of 100 mesh copper screen in air at 300° C. for 10 hours and then reducing the screen with hydrogen as described above at a temperature of 175° C. To a bomb reactor was added 5.99 g. of the reduced screen, 5.1 g. of water and 0.374 g. of acrylonitrile. The reactor was sealed and heated at 100° C. for 65 minutes. After the reaction, the contents were analyzed to find that 6.3% of the acrylonitrile had been converted and of the acrylonitrile converted 97.8% was acrylamide. No by-products were found.

EXAMPLE 11

Reduced Copper Oxide as Compared to Copper Metal

In a manner similar to Example 10, a porous cylindrical copper plug measuring ⅝ inch in diameter × 4 inches and sold by the Hyuck Corporation was used as a catalyst for the conversion of acrylonitrile to acrylamide. The reaction was conducted in a continuous manner by passing a 7% solution of acrylonitrile in water over the catalyst at a rate of 14 cc./hr. and at a temperature of 80° C. Without oxidation and reduction, the acrylonitrile was 7% converted and no acrylamide was detected in the product. Upon oxidation of the copper plug at 300° C. and reduction with hydrogen at 175° C., the acrylonitrile was about 20% converted and the yield of acrylamide was 50%.

EXAMPLE 12

Hydration of Methacrylonitrile

To a 15 cc. continuous flow reactor was added 17.35 g. of a 25–30 mesh copper-chromium oxide catalyst sold by the Girdler Chemical Company under the trade name G-13. After the catalyst had been used to convert acrylonitrile to acrylamide, it was oxidized with air at 300° C. and reduced with hydrogen at 175° C. The reactor feed was changed to a feed containing by weight 6% methacrylonitrile, 35% dioxane and 59% water. At a flow rate of 40 g./hr. and a temperature of 80° C., the conversion of the nitrile was 25% with greater than a 90% yield of methacrylamide.

EXAMPLE 13

Hydration of α-Methyleneglutaronitrile

In the same manner as shown by Example 12, 22.7 g. of a 10–40 mesh copper-chromium oxide catalyst sold by the Calsicat Chemical Company under the trade name CC 108-80 was used to hydrate acrylonitrile and then was oxidized and reduced. The reactor feed was 64% dioxane, 33% water and 3% α-methyleneglutaronitrile. At a flow rate of 30 g./hr. and a temperature of 80° C., the conversion of the nitrile to α-methyleneglutaramide was 2.5%.

EXAMPLE 14

Hydration of Benzonitrile

To a 50 ml. round-bottom flask equipped with a reflux condenser was added 1.1 g. of a 10–40 mesh copper-chromium oxide sold under the trade name Calsicat CC 108-80. The catalyst was reduced with hydrogen at 175° C. and after reduction was protected from contact with the atmosphere. To the reactor was added 2.08 g. of benzonitrile and 25 g. of water. The mixture was stirred for 4 hours at 100° C. and then cooled to 70° C. The catalyst was removed by filtration and washed with 50 ml. of water having a temperature of 70° C. The washing and the product were combined and evaporated to dryness. The residue was 2.2 g. of pure benzamide, and the conversion was calculated to be greater than 90%.

EXAMPLE 15

Hydration of Adiponitrile

In a 250 ml. round-bottomed flask, 100 g. of a 5.6% solution of adiponitrile in water and 20 g. of ⅛ inch × ⅛ inch copper-chromium oxide catalyst pellets sold under the trade name Harshaw Cu0203 were added. The catalyst had been reduced with hydrogen at 175° C. and protected from contact with the atmosphere. The mixture was heated to 80° C. with stirring for one hour. The catalyst was then removed by filtration and washed twice with hot water. The product and washings were combined and evaporated to dryness. The product obtained was 5.78 g. of pure adipamide. The conversion was 77%.

EXAMPLE 16

Hydration of Acetonitrile

To a 15 cc. continuous flow reactor was added 24 g. of 25–35 mesh copper-chromium oxide sold under the trade name Harshaw Cu0203. After use in the hydration of acrylonitrile, the catalyst was oxidized and reduced as shown in Example 12. The feed was 6.1% acetonitrile in water. At a flow rate of 48 g./hr. and a temperature of 80° C., the conversion was 54% and the yield of acetamide was greater than 95%.

EXAMPLES 17–22

Reduction of Copper Oxide with NaBH₄

Copper oxide pellets sold under the trade name Harshaw CuXL 112A-17-8-2 and measuring ⅛ inch × ⅛ inch were reduced with an aqueous solution of $NaBH_4$. About 8 g. of copper oxide pellets and 200 cc. of a solution of $NaBH_4$ were contacted for a period of 1 hour with agitation. The $NaBH_4$ concentration, pH and temperature of the reduction are shown in Table I along with a catalyst washed with only water for comparison. The $NaBH_4$ is basic in water; the acid pH were obtained by adding concentrated HCl to the $NaBH_4$ solution. The catalysts were tested by charging one gram of the pellets into a glass ampoule along with 5 cc. of a 7% aqueous solution of acrylonitrile. The acrylonitrile was reacted in the presence of the catalyst for one hour at 100° C. The results of these experiments are shown in Table I. No β-hydroxypropionitrile or other by-products were found.

TABLE I

Hydration of Acrylonitrile using Catalysts Prepared by Reducing Copper Oxide with NaBH₄

| | Copper Oxide Reduction | | | Hydration | |
|---|---|---|---|---|---|
| Ex. | NaBH₄ Conc. | pH | Temp., °C. | Conversion | Yield |
| 17 | 0 | Neutral | 25 | 24 | 57 |
| 18 | 0.25 | Basic | 25 | 78 | 84 |
| 19 | 0.50 | Basic | 25 | 89 | 83 |
| 20 | 0.50 | Acid | 25 | 68 | 86 |
| 21 | 0.50 | Basic | 90 | 83 | 93 |
| 22 | 0.50 | Acid | 90 | 53 | 70 |

EXAMPLE 23

Complete Reduction of Copper Oxide to Copper Metal

Copper oxide sold under the trade name Harshaw Cu0307 was reduced with a gaseous stream of 20% hydrogen in nitrogen at a rate of 640 cc./min. The reduction was conducted at a temperature of 225° C. for 4 hours. The weight loss during reduction was measured and it was determined that essentially 100% of the copper oxide had been reduced to the copper metal. In a test with 1 gram of the reduced catalyst, 5 g. of a 7% aqueous acrylonitrile solution was reacted for 1 hour at 80° C. The conversion of the acrylonitrile was 41%, the yield of acrylamide was 75%, and the yield of β-hydroxypropionitrile was about 9%.

In the same manner as described in the above examples, other copper-chromium oxides are used in the present invention, for example, copper-chromium oxides containing 10% copper oxide and 90% chromium oxide, 20% copper oxide and 80% chromium oxide, 60% copper oxide and 40% chromium oxide, 90% copper oxide and 10% chromium oxide, and 95% copper oxide and 5% chromium oxide, may be prepared and used as such or reduced with hydrogen.

The reduced copper oxide described above and in the examples may also be reduced with hydrogen under different conditions of reduction. For example, the copper-chromium oxide of Example 2 is reduced in a closed vessel under a hydrogen pressure of 200 atm. at 180° C. for 30 minutes. As another example, an oxide containing 20% copper oxide and 80% chromium oxide is reduced in a stream of hydrogen at 250° C. for 3 hours. Likewise, they may also be reduced by other methods of reduction, for example, by a stream of carbon monoxide at a temperature of 300° C. All such catalysts may be used to convert acrylonitrile to acrylamide. Also, these copper oxides are reduced in aqueous sodium borohydride to give a desirable catalyst. Hydrazine is employed to reduce copper oxide by contacting a 2 molar aqueous solution of hydrazine with the copper oxide at reflux temperature.

In a similar manner as described above, catalysts containing copper oxides in admixture with other metal oxides can be used in reduced or unreduced form. For example, catalysts containing 10% copper oxide and 90% molybdenum oxide, 50% copper oxide and 50% molybdenum oxide or 90% copper oxide and 10% molybdenum oxide, 70% copper oxide and 30% zinc oxide are prepared and used as such or in the reduced form to convert nitriles to the corresponding amide. Also, mixtures of copper, chromium and molybdenum oxides can be used.

The (a) copper prepared by reducing copper oxide, (b) reduced copper oxide or (c) copper oxide, catalysts described above may be used to convert nitriles other than acrylonitrile to the corresponding amide, for example, the reduced copper-chromium oxide catalyst of Example 3 may be used to convert hexanonitrile to hexanoamide, to convert ethylacrylonitrile to ethylacrylamide and to convert p-toluonitrile to p-toluoamide or the unreduced copper-chromium oxide catalyst of Example 7 could be used to convert other aliphatic nitriles to the corresponding amide, for example, butyronitrile to butyramide. The principal by-product of β-hydroxypropionitrile formed with acrylonitrile is not obtained with these other nitriles.

Reactant feeds other than a liquid 7% solution of acrylonitrile in water may also be used, for example, the feed may be a 3% solution of water in acrylonitrile, a mixture of 3 parts of water, 1 part of acrylonitrile and 2 parts of dioxane or a gaseous feed of 4 parts of water and 1 part of acrylonitrile. For reactants other than acrylonitrile, the feed may also vary widely, for example, in the conversion of acetonitrile to acetamide a reactant feed of 20 parts of water to 1 part of acetonitrile may be employed in a continuous reactor.

We claim:

1. In the process for converting a nitrile to the corresponding amide by reacting the nitrile with water in the presence of a catalyst, the improvement comprising conducting the reaction in the presence of a catalytic amount of copper prepared by reducing copper oxide.

2. The process of claim 1 wherein the catalyst contains reduced copper-chromium oxide or reduced copper-molybdenum oxide.

3. The process of claim 2 wherein the catalyst comprises a reduced copper-chromium oxide or reduced copper-molybdenum oxide which contained 10 to 90% copper oxide and 10 to 90% chromium oxide or molybdenum oxide before reduction.

4. The process of claim 2 wherein the catalyst comprises a reduced copper-chromium oxide or reduced copper-molybdenum oxide which contained at least about 50% copper oxide before reduction.

5. The process of claim 1 wherein the catalyst contains reduced copper-chromium oxide.

6. The process of claim 1 wherein the copper oxide was reduced at a temperature of about 50° to about 500° C.

7. The process of claim 1 wherein the copper oxide was reduced at a temperature of about 100° to about 300° C.

8. The process of claim 1 wherein the copper oxide was reduced at a temperature of about 120° to about 250° C.

9. The process of claim 1 wherein the copper oxide is reduced by contact with NaBH₄ or hydrazine in the liquid phase.

10. The process of claim 1 wherein the catalyst contains both copper prepared by reducing copper oxide and copper oxide.

11. The process of claim 1 wherein the nitrile is an aliphatic or aromatic hydrocarbon nitrile of up to about 20 carbon atoms.

12. The process of claim 1 wherein the nitrile is an olefinic nitrile of 3 to 6 carbon atoms.

13. The process of claim 1 wherein the nitrile is acrylonitrile.

14. The process of claim 1 wherein the temperature is about 0° to about 400° C.

15. The process of claim 1 wherein the temperature is about 25° to about 200° C.

16. The process of claim 1 wherein the reaction is conducted in the liquid phase.

17. The process of claim 1 wherein the catalyst is reduced copper-chromium oxide, the nitrile is acrylonitrile and the reaction is carried out in the liquid phase at a temperature of 25° to 200° C.

18. The process of claim 10 wherein at least 50% of the copper content of the catalyst is cuprous oxide.

19. The process of claim 10 wherein the copper content of the catalyst is essentially cuprous oxide containing a minor amount of copper metal.

* * * * *